US012669005B2

(12) United States Patent
Edokpayi

(10) Patent No.: US 12,669,005 B2
(45) Date of Patent: Jun. 30, 2026

(54) BREAKOUT CRAWL ARRESTER

(71) Applicant: Overhead Door Corporation, Lewisville, TX (US)

(72) Inventor: Frank Isioma Edokpayi, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 18/680,391

(22) Filed: May 31, 2024

(65) Prior Publication Data

US 2025/0146342 A1 May 8, 2025

Related U.S. Application Data

(60) Provisional application No. 63/597,234, filed on Nov. 8, 2023.

(51) Int. Cl.
*E05D 15/48* (2006.01)
*E05D 15/06* (2006.01)
*E05D 15/58* (2006.01)

(52) U.S. Cl.
CPC ......... *E05D 15/48* (2013.01); *E05D 15/0604* (2013.01); *E05D 15/58* (2013.01); *E05D 2015/485* (2013.01); *E05D 2015/586* (2013.01); *E05Y 2800/25* (2013.01); *E05Y 2900/132* (2013.01)

(58) Field of Classification Search
CPC ..... E05D 15/0604; E05D 15/48; E05D 15/58; E05D 2015/485; E05D 2015/586; E05Y 2800/25
See application file for complete search history.

(56) References Cited

U.S. PATENT DOCUMENTS

| | | | | | |
|---|---|---|---|---|---|
| 3,300,897 | A * | 1/1967 | Wikkerink | E06B 3/5072 | 49/141 |
| 3,750,334 | A * | 8/1973 | Slaybaugh | E05D 15/0604 | 49/177 |
| 8,096,342 | B2 * | 1/2012 | Scruggs | E05D 15/08 | 160/218 |
| 8,756,864 | B2 * | 6/2014 | Hamaker | E05D 15/48 | 49/168 |
| 10,280,678 | B1 * | 5/2019 | Rendon, Jr. | E06B 3/509 | |
| 10,472,872 | B2 * | 11/2019 | Ingram | E05D 15/58 | |
| 11,555,344 | B2 * | 1/2023 | Patel | E06B 5/00 | |
| 12,241,295 | B1 * | 3/2025 | Harrell | E05D 15/0652 | |
| 12,291,912 | B2 * | 5/2025 | Patel | E06B 5/00 | |

(Continued)

*Primary Examiner* — Justin B Rephann

(74) *Attorney, Agent, or Firm* — Haynes and Boone, LLP

(57) ABSTRACT

A breakout door system is provided which may include: a door frame; a first door configured to selectively slide and pivot between an open and closed position slide position and an opened and closed pivot position with respect to the door frame; a crawl arrester configured to move between a deployed position when the first door is not in a closed pivot position and a stowed position when the first door is in a closed pivot position, the crawl arrester mounted to one of the first door and frame; and an arrester stop mounted to the other of the first door and frame than the crawl arrester, wherein when the crawl arrester is in the deployed position, the crawl arrester contacts the arrester stop to prevent the second side of the first door from dropping in a downward direction.

20 Claims, 15 Drawing Sheets

(56) References Cited

U.S. PATENT DOCUMENTS

| | | | | |
|---|---|---|---|---|
| 2007/0169899 | A1* | 7/2007 | Cianciolo | E05D 15/08 160/211 |
| 2012/0159851 | A1* | 6/2012 | Seymour | E06B 3/5072 49/177 |
| 2012/0255230 | A1* | 10/2012 | Smith | E06B 3/5063 49/257 |
| 2014/0224435 | A1* | 8/2014 | Stawski | E06B 3/486 160/192 |
| 2017/0241175 | A1* | 8/2017 | Hammerer | E05D 3/16 |
| 2020/0011109 | A1* | 1/2020 | Patel | E06B 3/509 |
| 2023/0323719 | A1* | 10/2023 | Duer | E05D 15/264 312/109 |
| 2023/0392426 | A1* | 12/2023 | Patel | E05B 65/087 |

* cited by examiner

BREAKOUT CRAWL ARRESTER

PRIORITY

This application claims the benefit of the filing date of U.S. Provisional Application No. 63/597,234, filed Nov. 8, 2023, which is incorporated herein by reference in its entirety.

This application is related to U.S. application Ser. No. 18/680,515 filed May 31, 2024, entitled "Adjustable Breakout Device" and U.S. application Ser. No. 18/680,939 filed May 31, 2024, entitled "Adjustable Floor Mounted Pivot Plate", which are both incorporated by reference herein in their entirety.

TECHNICAL FIELD

The present disclosure relates generally to sliding door systems, and more particularly to sliding door systems with breakout functionality. In particular, the sliding door system may include a breakout crawl arrester that lends support to the panels of the door during a breakout procedure.

BACKGROUND

Sliding door systems are sometimes used as entryways and exits to intensive care units ("ICU") and critical care units in hospitals. In particular, patient rooms in these units are often equipped with large manual sliding doors. The doors are often glass (sometimes in aluminum door frames) to allow medical professionals a view of the patients that need round-the-clock monitoring. Because stretchers, wheelchairs, and other medical equipment are frequently moved in and out of the ICU, sliding doors are often employed. ICUs and other hospital facilities also have certain environmental standards that should be maintained to ensure a healthy environment for patient recovery which impact the type of doors available for use. For example, in certain ICUs, the sliding doors do not have tracks to reduce the ingress of contaminants. For example, many intensive care units have sliding doors that are supported without a bottom track that is fixed to the floor. In these types of doors, the upper track provides the primary support and guides the linear motion of the door as it slides to open and close. However, this design can involve putting a large amount of weight on only a few small components of the door, which may lead to wear and damage over time, as well as decreased functionality of the doors.

Another requirement of some sliding doors such as those used in a hospital application is the ability to "breakout." That is, these doors should have the ability to rotate off the track, so that a pushing force will cause the door to swing open. The terms "breakout," "breakaway," and "swingout" refer to the ability of the door to be opened by rotating the panels of the door off of the track, as opposed to the normal sliding motion of the panels. The breakout feature may be employed in various circumstances such as for an emergency or to accommodate larger equipment such as gurneys or patient beds, and should be able to be accomplished without requiring detailed knowledge of the workings of the door or specific steps that must be followed to allow emergency egress through a telescoping sliding door that has been broken away.

However, many existing breakout doors are problematic because they lack sufficient support for the weight required for the breakout door panels. For example, breakout doors are generally only supported by one or two support points.

This can lead to undesired sagging as well as horizontal movement of the door panels during breakout. This motion can lead to contact between the door panels and the flooring which can ultimately damage the door as well as flooring. Therefore, needs exist for better support for telescoping doors with breakout functionality.

SUMMARY

One or more of the foregoing needs may be met by embodiments in accordance with the present disclosure, wherein, embodiments may include a breakout door system with a breakout crawl arrester. The door system includes: a door frame; a first door configured to selectively slide and pivot between an open and closed slide position and an opened and closed pivot position with respect to the door frame; a crawl arrester configured to move between a deployed position when the first door is not in a closed pivot position and a stowed position when the first door is in a closed pivot position, the crawl arrester mounted to one of the first door and frame; and an arrester stop mounted to the other of the first door and frame than the crawl arrester, wherein when the crawl arrester is in the deployed position, the crawl arrester contacts the arrester stop to limit the first door from moving past a threshold amount toward the open slide position.

In one aspect, the disclosure describes a method of stopping a door configured to selectively pivot and slide. The method includes: moving a crawl arrester to a deployed position when the door is not in a pivot closed position; and butting the crawl arrester against a slide stop when the crawl arrester is in a deployed position.

In another aspect, the disclosure describes a breakout door system. The door system includes: a door frame; a first door configured to selectively slide and pivot between an open and closed position slide position and an opened and closed pivot position with respect to the door frame; a crawl arrester configured to move between a deployed position when the first door is not in a closed pivot position and a stowed position when the first door is in a closed pivot position, the crawl arrester mounted to one of the first door and frame; an arrester stop mounted to the other of the first door and frame than the crawl arrester, wherein when the crawl arrester is in the deployed position, the crawl arrester contacts the arrester stop to limit the first door from moving past a threshold amount toward the open slide position; a spring biasing the crawl arrester to the deployed position; a spring projection located on the crawl arrester and configured to allow the spring to bias the crawl arrester to the deployed position; and a rocking projection located on the crawl arrester, configured to move the crawl arrester to the stowed position when the door is in a closed pivot position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
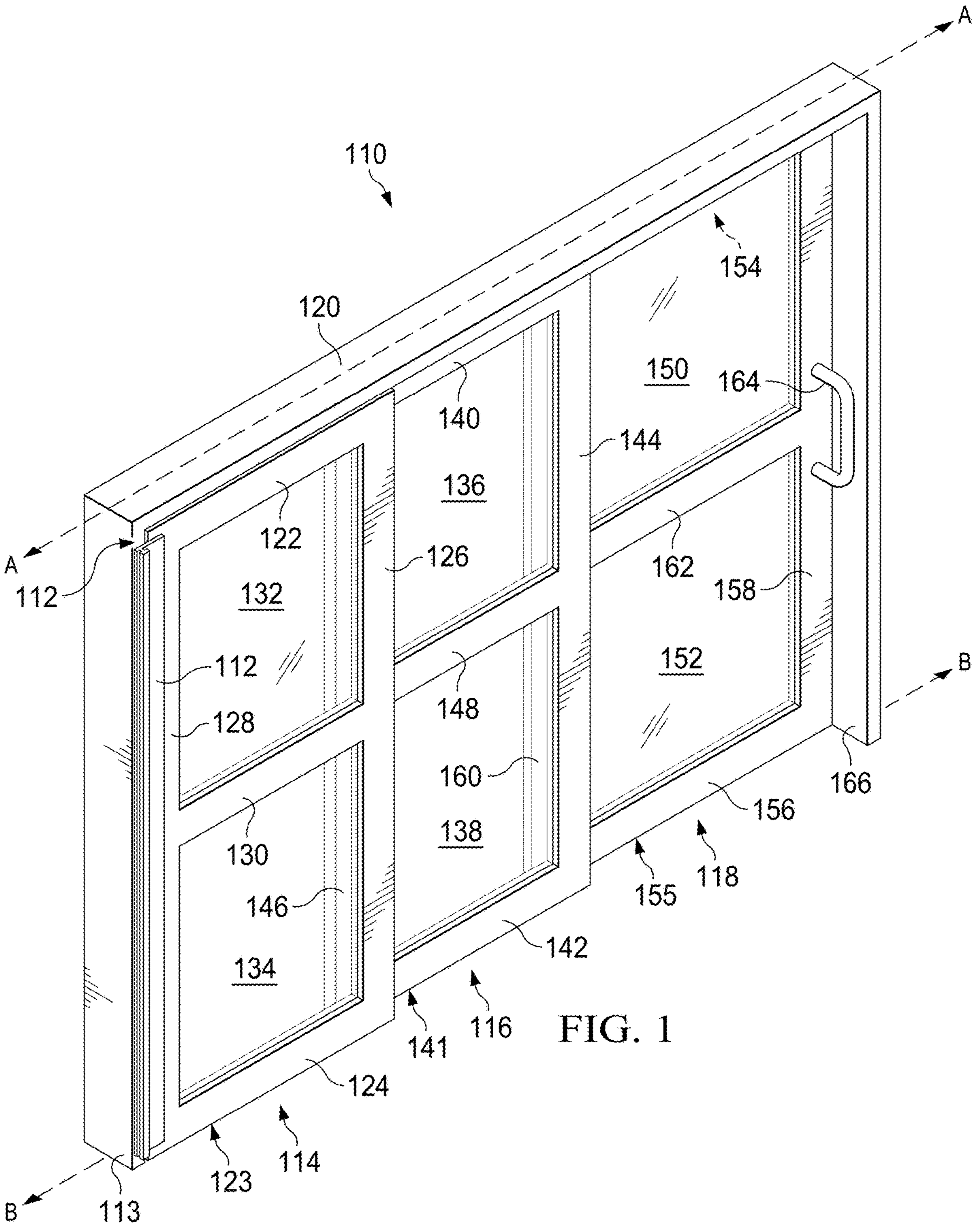
FIG. 1 shows a perspective view of a telescoping door system according to an embodiment of the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 is a perspective view of the sliding door system (which may be a telescoping door system) 110 which may include door panels 114, 116, 118 (which may also be referred to as doors). In particular, the telescoping door system 110 may include a sidelite panel 114, a slow slide panel 116, and a fast slide panel 118. The panels or door panels 116, 118 are slidable and all panels 114, 116, and 118 are able to pivot (i.e., suitable for breakout). When the panels 116 and 118 are slid to the closed position, this may be referred to as the slide closed position as shown in FIG. 1. The sidelite panel 114 is coupled to the trailing door jamb 113 for pivotal movement, however, the sidelite panel 114 does not move linearly. The slide panels 116, 118 are also known as the Swing Slide or "SX," panels or doors and the sidelite panel 114 is known as the Swing Only or "SO" panel or door.

The teachings of the present disclosure are not limited to a three-panel telescoping door system, but rather may be also employed with a dual-panel slide/swing door system. In this case, the telescoping door system 110 would include a single sliding door panel (such as 116) as well as a nonsliding door panel (such as 114). In other implementations, two, three, or more than three door panels may be included in the telescoping door system 110.

In some implementations, the door panels 114, 116, 118 are arranged to extend in approximately the same direction such that the door panels 114, 116, 118 may be configured to fully or partially close a doorway. In particular, the sidelite panel 114 may be configured to stay relatively motionless during opening or closing of the door system 110, whereas slide panels 116, 118 are configured to move relative to the first door panel 114. The slow slide panel 116 is immediately coupled to the sidelite panel 114, and the fast slide panel 118 is immediately coupled to and leads the slow slide panel 116. The slide panels 116, 118 and the sidelite panel 114 may be supported by a header 120. The header 120 may include a track that guides the linear motion of the slide panels 116, 118 of the telescoping door system 110 (i.e., along path A as shown in FIG. 1). According to certain embodiments, the header 120 may be aluminum or nylon covered aluminum. The slide panels 116, 118 move linearly with respect to the sidelite panel 114 in a telescoping manner with the fast slide panel 118 leading and controlling the linear movement of the slow slide panel 116. This linear movement may also be referred to as sliding movement. The bottom of the slow slide panel 116 may also be guided by a track that is generally located on the underside of the sidelite panel 114 (i.e., running along path B as shown in FIG. 1). The bottom of the fast slide panel 118 is guided by a track formed in a bottom rail 142 of the slow slide panel 116.

Figure 2:
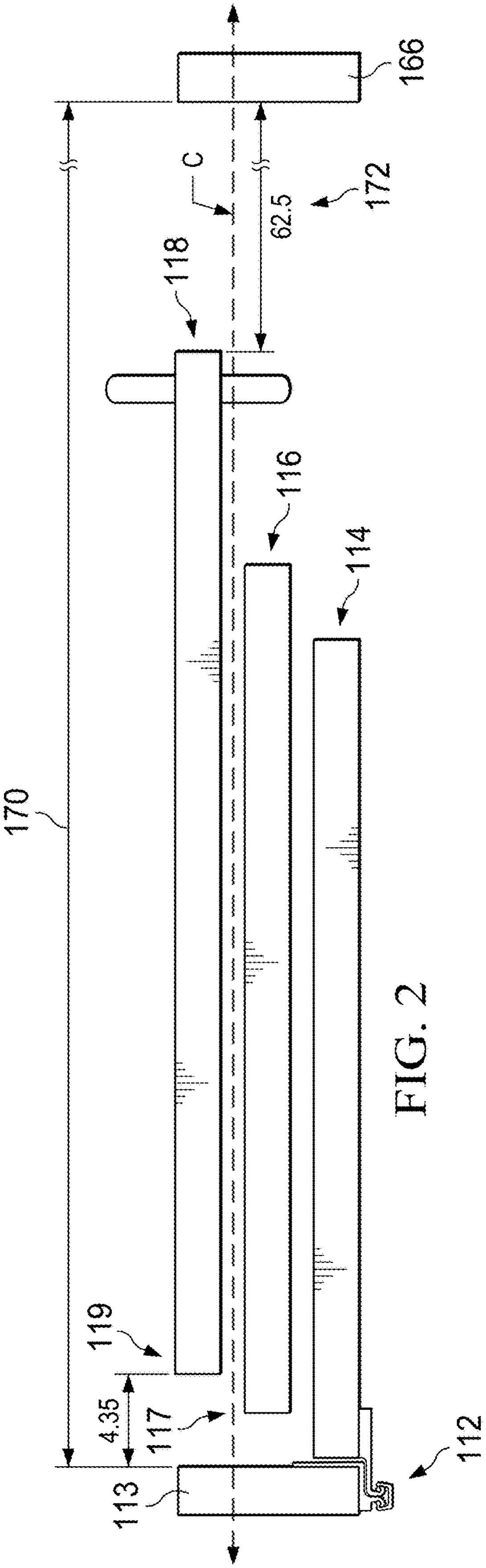
FIG. 2 is an illustration of a top view of the telescoping door system shown in FIG. 1 in a standard (or non-breakout) position according to an embodiment of the present disclosure.
Figure 3:
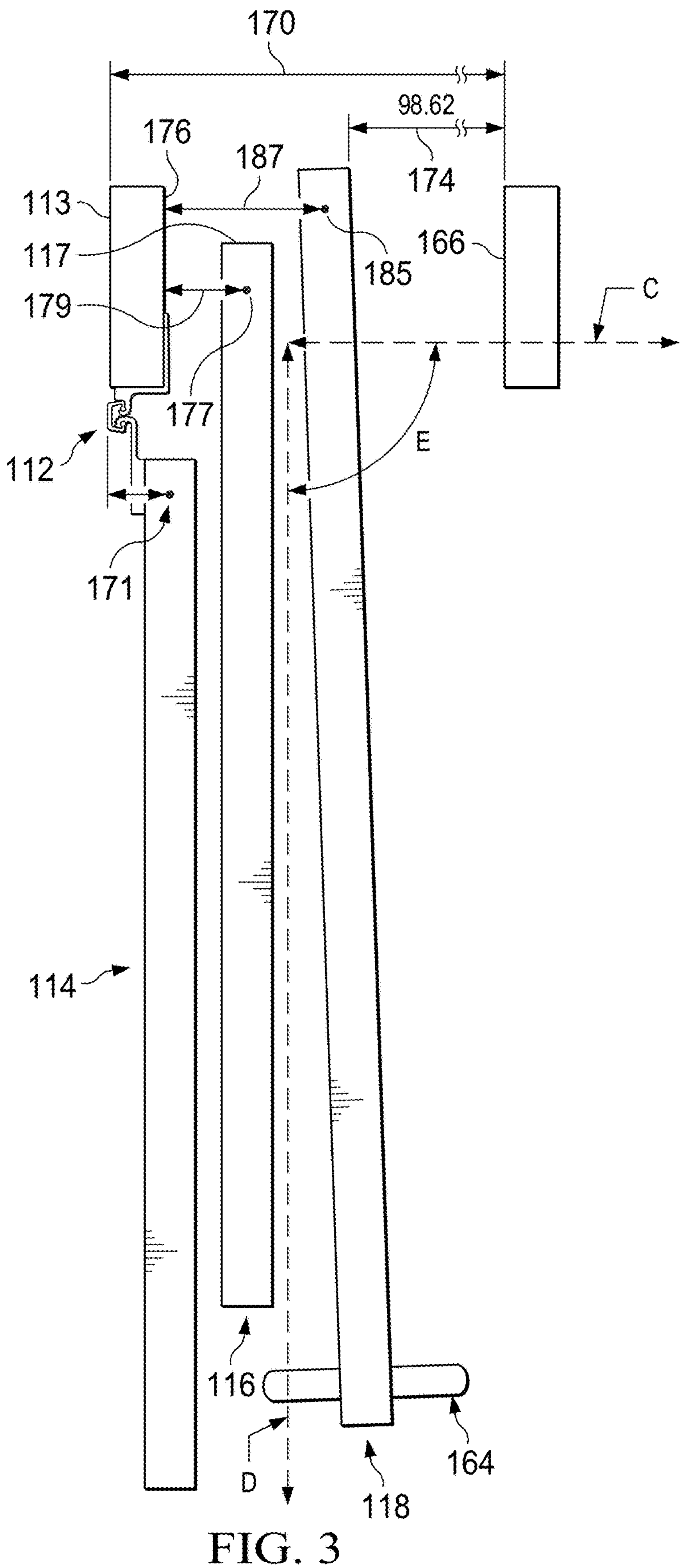
FIG. 3 is an illustration of a top view of the telescoping door system shown in FIG. 1 shown in a breakout position according to an embodiment of the present disclosure.

With reference to FIGS. 1-5, the telescoping door system 110 may also include a breakout hinge 112 that allows the panels 114, 116, 118 of the door system 110 to be broken out. When broken out, the panels 114, 116, 118 are able to rotate about the breakout hinge 112 along path E (shown in FIGS. 3 and 5). Breaking out the panels 114, 116, 118 may create a large opening through which oversized equipment, furniture, and the like may fit through. While a specific type of hinge 112 (swing clear continuous geared hinge) is shown in FIG. 2 and FIG. 3, any typical hinge 112 (piano, pin, or any other suitable hinge) may be used as appreciated by one of ordinary skill in the art after reviewing this disclosure.

FIG. 2 is a schematic of a top, plan view of the telescoping door system 110 illustrating the distances of the various panels 114, 116, 118 with respect to the door jambs 113, 166 to illustrate the fully open position (sometimes referred to as the slide open position) of the telescoping door system 110. The area between the lead jamb 166 and the trailing jamb 113 is referred to as the clear opening 170. According to one embodiment, the distance of the clear opening 170 may be 100-120 inches, for example 108 inches. In other embodiments, the clear opening 170 is less than 100 inches or greater than 120 inches. Each of the door panels 114, 116, 118 is disposed in the clear opening 170, and a portion of the clear opening 170 defines the slide opening 172 and the breakout opening 174 (also referred to as a pivot opening or a swing opening) (see FIG. 3). The slide opening 172 is present and at its greatest length when the slide panels 116, 118 are fully slid open linearly. That is, the slow slide panel 116 and the fast slide panel 118 are each positioned linearly closest to the trailing jamb 113. The panels 114, 116, 118 of the telescoping door system 110 may be configured to slide along line C as shown in FIG. 2.

FIG. 3 illustrates a schematic of a top, plan view of the telescoping door system 110 which has been broken out. In particular, the panels 114, 116, 118 have been pivoted such from their original arrangement along line C to a breakout line D (where angle E is the angle between lines C and D). This breakout position forms breakout opening 174. The pivot motion of the sidelite panel 114 is facilitated by the hinge 112. The breakout opening 174 illustrated in FIG. 3 is created when each of the slide panels 116, 118 are positioned closest to the trailing jamb 113 and each of the slide panels 116, 118 and the sidelite panel 114 are pivoted such the panels 114, 116, 118 are rotated approximately 90 degrees toward the sidelite side of the clear opening 170. In other implementations, the panels 114, 116, 118 may be rotated less than 90 degrees in a breakout position.

In this breakout position, the panels 114, 116, 118 cannot be linearly moved with respect to each other to close the slide opening 172. The breakout opening 174 is significantly larger than the slide opening 172. In a hospital, the slide opening 172 is used for ingress and egress of typical foot traffic, but if a bed or other large equipment needs to be moved through the door system 110, the panels 114, 116, 118 may be pivoted to create the larger breakout opening 174.

In some implementations, tracks 123, 141, 155 may be disposed in the underside of each of the door panels 114, 116, 118, respectively. These tracks may be used to constrain and guide the motion of door panels 116, 118 with respect to the other slide panels 114, 116, 118. A pivot assembly may also be included that is disposed within these tracks 123, 141, 155. This pivot assembly is discussed in further detail in the copending application entitled "Adjustable Breakout Device" which is incorporated by reference herein in its entirety.

The sidelite panel 114 may include a top rail 122, a bottom rail 124, a lead rail 126, a trailing rail 128, and a mid-rail 130. An upper pane of glass 132 is framed by a portion of the lead rail 126, the trailing rail 128, the top rail 122, and the mid-rail 130. A lower pane of glass 134 is framed by portions of the lead rail 126, the trailing rail 128, the bottom rail 124, and the mid-rail 130. The slow slide panel 116 similarly includes upper and lower glass panes 136, 138 framed by a top rail 140, a bottom rail 142, a lead rail 144, a trailing rail 146, and a mid-rail 148. The fast slide panel 118 also includes upper glass pane 150 and lower glass pane 152 framed by an upper rail 154, a bottom rail 156, a lead rail 158, a trailing rail 160, and a mid-rail 162. The rails may be made of any suitable material such as steel, other metals, PVC, wood, composites, or the like. However, in certain embodiments a lightweight material, such as aluminum may be used for the various rails of the door system 110. According to an alternate embodiment, each panel may have no glass panes, one glass pane, two glass panes, or more than two glass panes.

A user may move the telescoping door system 110 from a fully open position to a fully closed position by manually applying a force to a handle 164 disposed on the lead rail 158 of the fast slide panel 118 to displace the fast slide panel 118 toward a lead jamb 166. The fast slide panel 118 is linearly displaced a certain distance, and it catches the slow slide panel 116 and displaces it toward the lead jamb 166 until the fast slide panel 118 reaches the lead jamb 166. The fast slide panel 118 may be positively latched to maintain the door system 110 in the fully closed position. To move the telescoping door system 110 from the fully closed position to the fully open position, the reverse occurs when the user applies the force to the fast slide panel 118 to linearly displace it toward the trailing jamb 113 (also referred to herein as a pivot jamb), and after the fast slide panel 118 is linearly displaced a certain distance, it catches the trailing end 117 (see FIG. 2) of the slow slide panel 116 and displaces it toward the trailing jamb 113. Alternatively, the linear motion of the slide panels 116, 118 may be driven by an operator for automatic sliding movement of the panels 116, 118.

In pivoting the panels 114, 116, 118 to form the breakout opening 174, each panel 114, 116, 118 may pivot on its own pivot axis 171, 177, 185, respectively. Each pivot axis 171, 177, 185 location and door system 110 dimensions are selected to allow the other adjacent panels to pivot approximately 90 degrees without the panels 114, 116, 118 interfering with each other.

It should be understood that the slide open limit of the slow slide panel 116 is associated with its pivot axis 177. So, when the slow slide panel 116 is slid open such that its trailing end 117 is positioned closest to the trailing jamb 113, (as shown in FIG. 2) the slow slide panel 116 is in position to allow it to pivot to its breakout position without interfering with the pivot motion of the sidelite panel 114. The same is true for the fast slide panel 118.

As shown in FIG. 3, the pivot axis 177 of the slow slide panel 116 is disposed a distance 179 from the face 176 of the trailing jamb 113 and the pivot motion of the slow slide panel 116 does not interfere with the pivot motion of the sidelite panel 114. Similarly, the pivot axis 177 of the slow slide panel 116 is disposed a closer distance 179 to the face 176 of the trailing jamb 113 than the distance 187 of the pivot axis 185 and the pivot motion of the fast slide panel 118 and does not interfere with the pivot motion of the slow slide panel 116.

Figure 4:
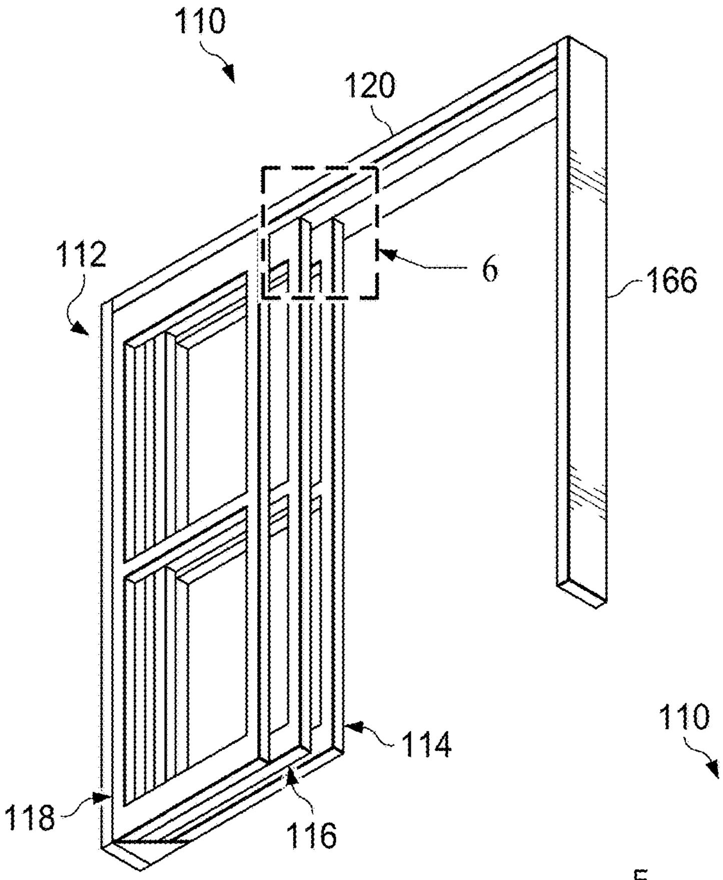
FIG. 4 is a perspective view of a door frame for a door system where the doors are in a non-broken out position according to an embodiment of the present disclosure.
Figure 5:
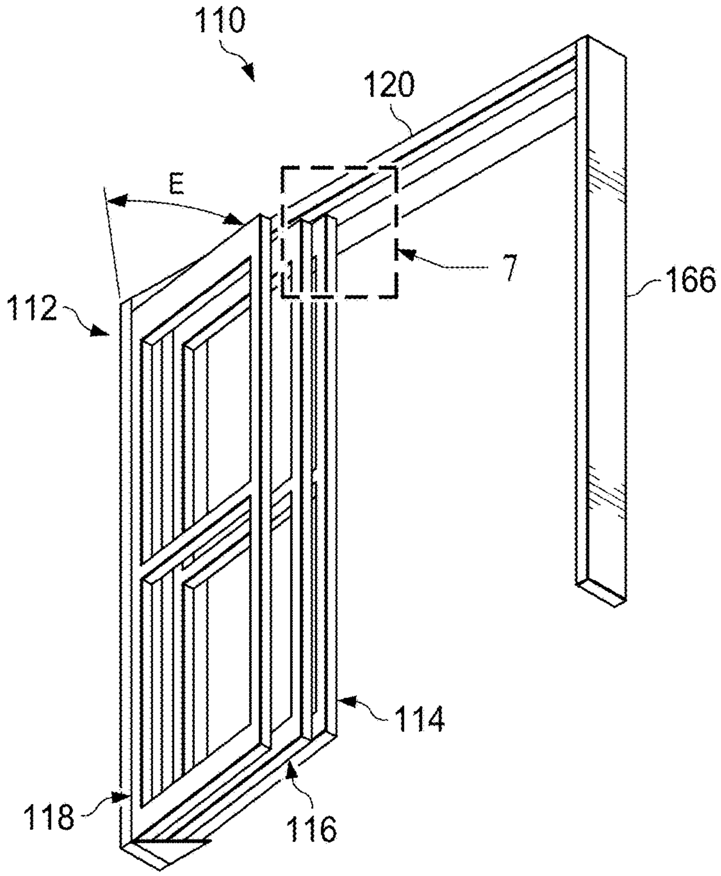
FIG. 5 is a perspective view of a door frame for a door system where the doors are in a broken out position according to an embodiment of the present disclosure.

FIG. 4 shows a perspective view shown of the door system 110 in a non-broken out or pivot closed position. FIG. 5 shows the door system 110 is a partially broken out or pivot open position. The door system 110 includes the sidelite panel 114, the slow slide panel 116, and the fast slide panel 118. The header 120 and lead jamb 166 are also shown.

The telescoping door system 110 may also be one half of a dual telescoping door system 110 where a second multi-panel telescoping door is disposed opposite the telescoping door system 110 such that a fully closed position has the two telescoping door systems 110 meeting each other in a center of the door frame or opening.

In some implementations, the telescoping door system 110 may include a floor mounted track passing along path B that may help to guide the linear or sliding motion of the slide panels 116, 118. In other implementations, the telescoping door system may not include a floor mounted track. For example, in certain healthcare facilities such as an intensive care unit in a hospital, it may be undesirable to have a floor track.

In various implementations, the telescoping door system 110 may include one or more features that improve its functionality over existing designs, and in particular, improve the function of the door during breakout procedures. These features include a breakout crawl arrester 194 discussed in reference to FIGS. 4-16. These features may also be included in a telescoping door system 110 that is configured for use in various applications. For example, in one implementation, a telescoping door system 110 may be used in a trackless configuration in a hospital that includes a crawl arrester 194. In another embodiment, a telescoping door system 110 with a breakout crawl arrester 194 may be used in a tracked configuration.

One common characteristic of some break out door systems 110 is that when the panels 114, 116, 118 break out, the panels 114, 116, 118 may drop the non-pivot end due to an absence of a restraint in the slide direction. The breakout position may also be referred to as a pivot open position and the non-break out position may be referred to as a pivot closed position. The pivot open and pivot closed positions refer to the panels 116 and 118 positions with respect to the door frame components 113, 120, and 166.

When in the breakout or pivot open position, there can be a tendency of the panel or door panels 116, 118 to move or "crawl" in the direction of the lead jamb 166 during a breakout. This crawling motion, if allowed, may result in the non-pivot end of the door panel to drop and drag on the ground. This dropping and dragging may be undesirable as it may cause difficulty in breaking open the door and may result in damage to the door panels 114, 116, 118 or the floor.

In implementations of the present disclosure, a breakout crawl arrester 194 may be provided to reduce the effects of crawl and subsequent characteristics of difficulty in breaking open the door and potential floor damage. The breakout crawl arrester 194 is explained in further detail below and with reference to FIGS. 4-17. The breakout crawl arrester 194 may be used with the adjustable breakout device and adjustable floor mounted pivot plate discussed in copending applications "Adjustable Breakout Device" and "Adjustable Floor Mounted Pivot Plate" which are incorporated by reference herein in their entirety.

According to some implementations, the sidelite panel 114 includes a latch assembly 600 which may include a crawl arrester 194. The breakout crawl arrester 194 may comprise a shoulder bolt that is retracted from the header 120 to allow the sidelite panel 114 to pivot out of the door frame. A biasing member, such as a spring 202, may bias the breakout crawl arrester 194 toward its extended and locked position. The door system 110 can only be broken out when the latch assembly 600 is released.

Figure 6:
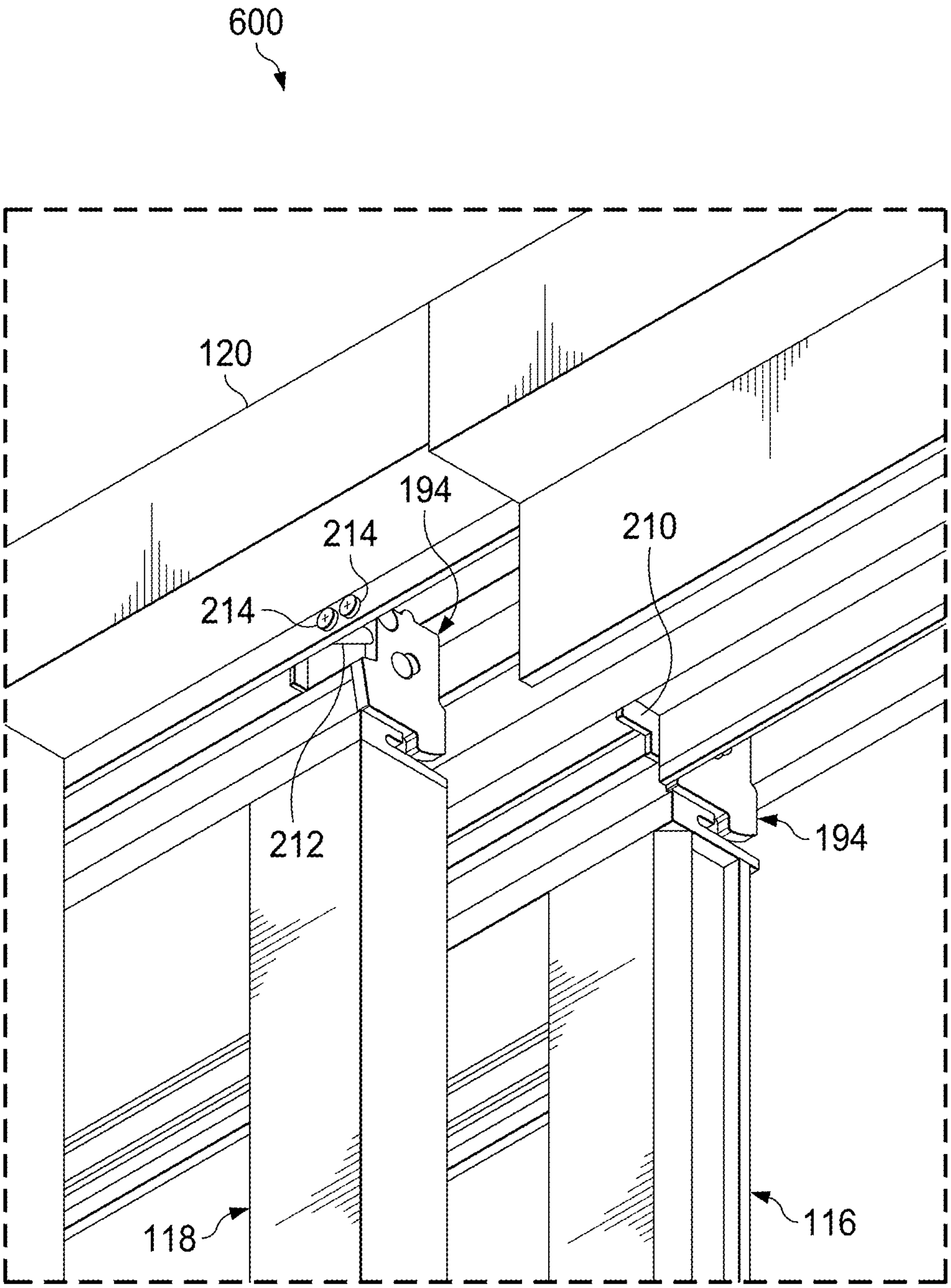
FIG. 6 is a perspective view of part of a door and part of a door frame for a door system where the door is in a non-broken out position according to an embodiment of the present disclosure.
Figure 7:
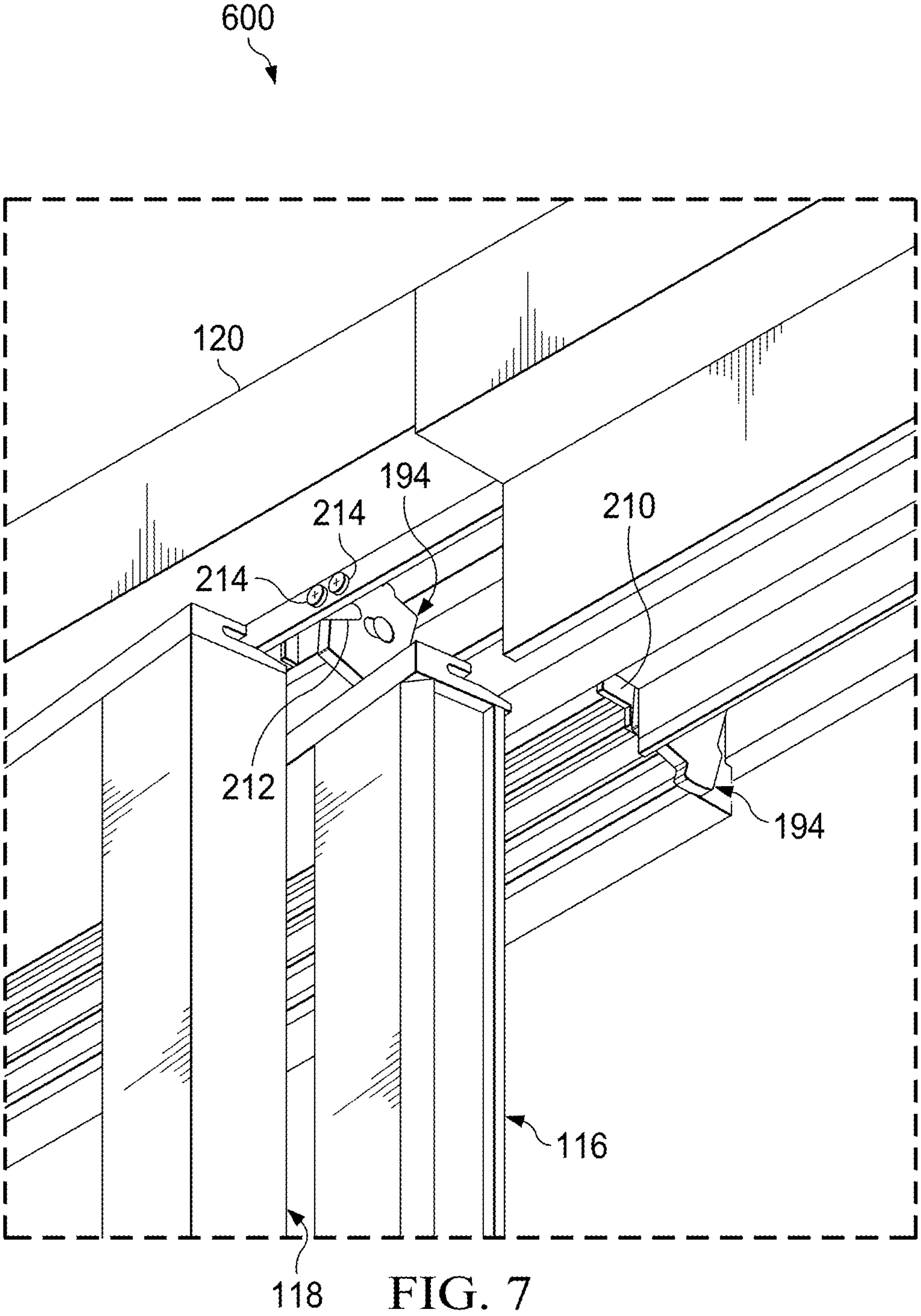
FIG. 7 is a perspective view of part of a door and part of a door frame for a door system where the door is in a broken out position according to an embodiment of the present disclosure.
Figure 14:
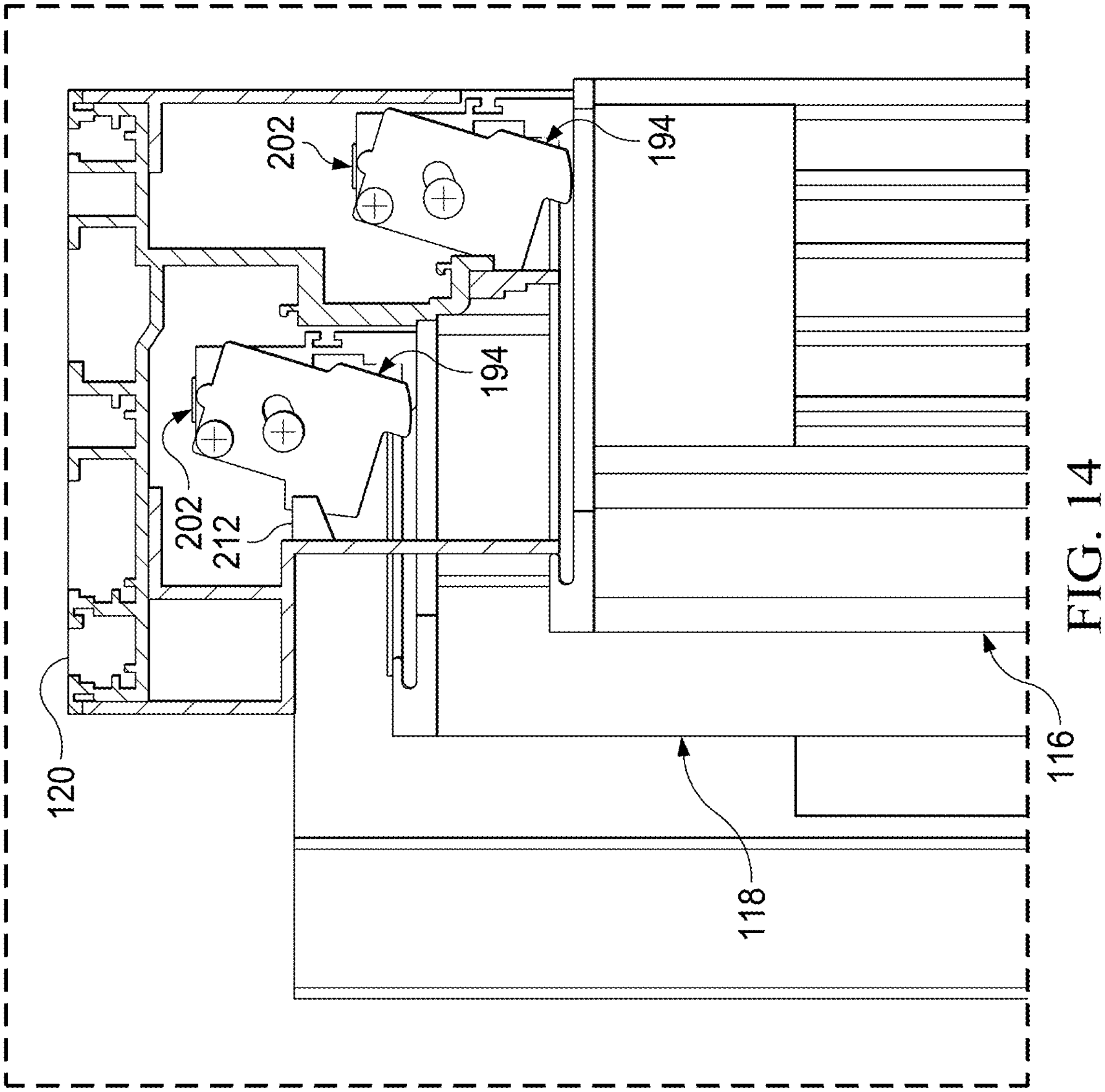
FIG. 14 is an enlarged view of a portion of FIG. 13, enlarging the portion encircled by box 14 in FIG. 13 according to an embodiment of the present disclosure.
Figure 13:
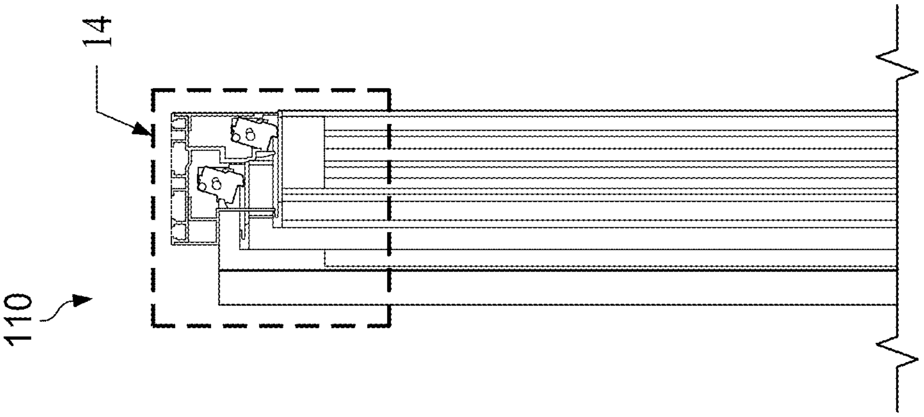
FIG. 13 is a cross-section view of the door system shown in FIG. 10 taken along line 11 according to an embodiment of the present disclosure.
Figure 15:
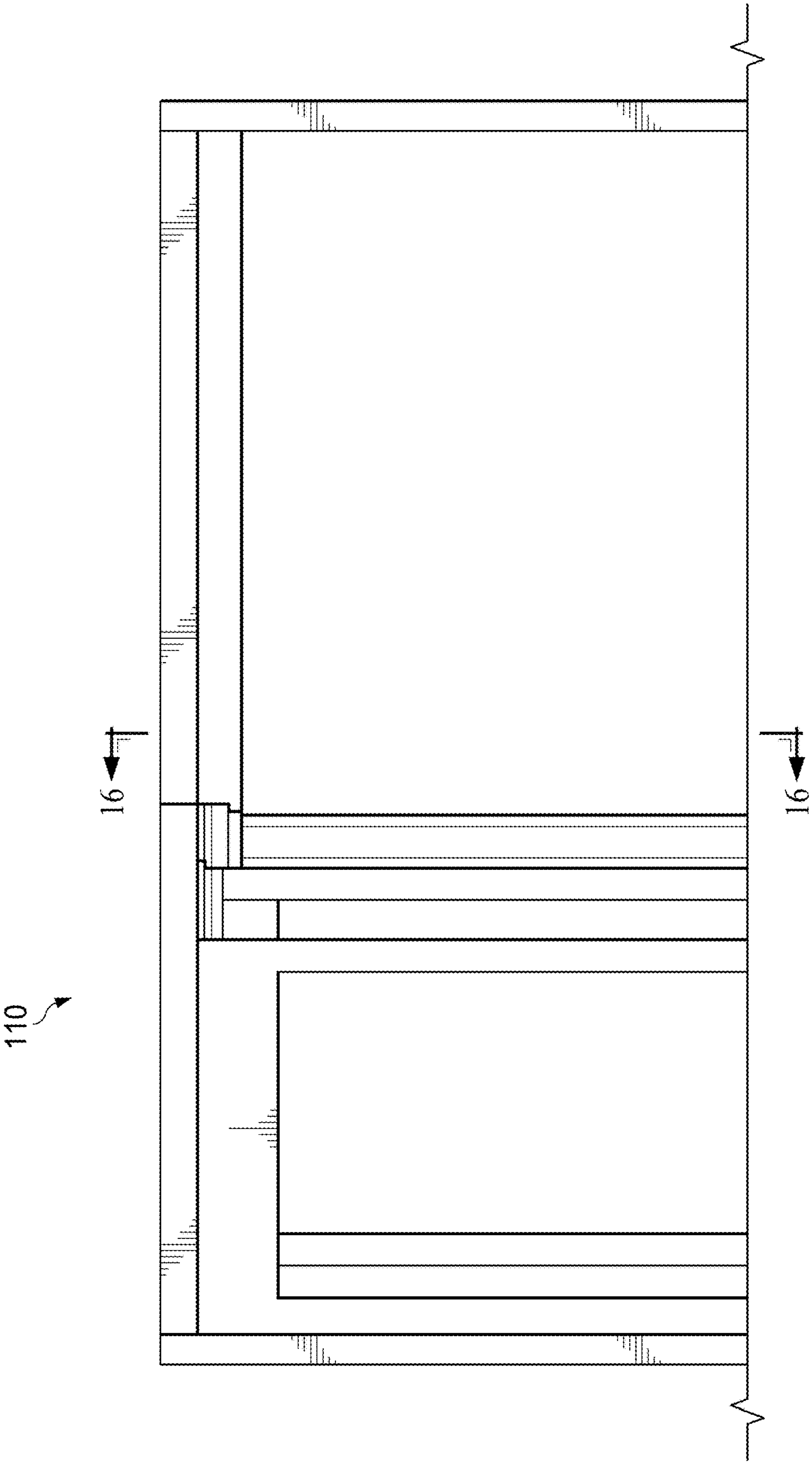
FIG. 15 is a front view of a door system according to an embodiment of the present disclosure.
Figure 17:
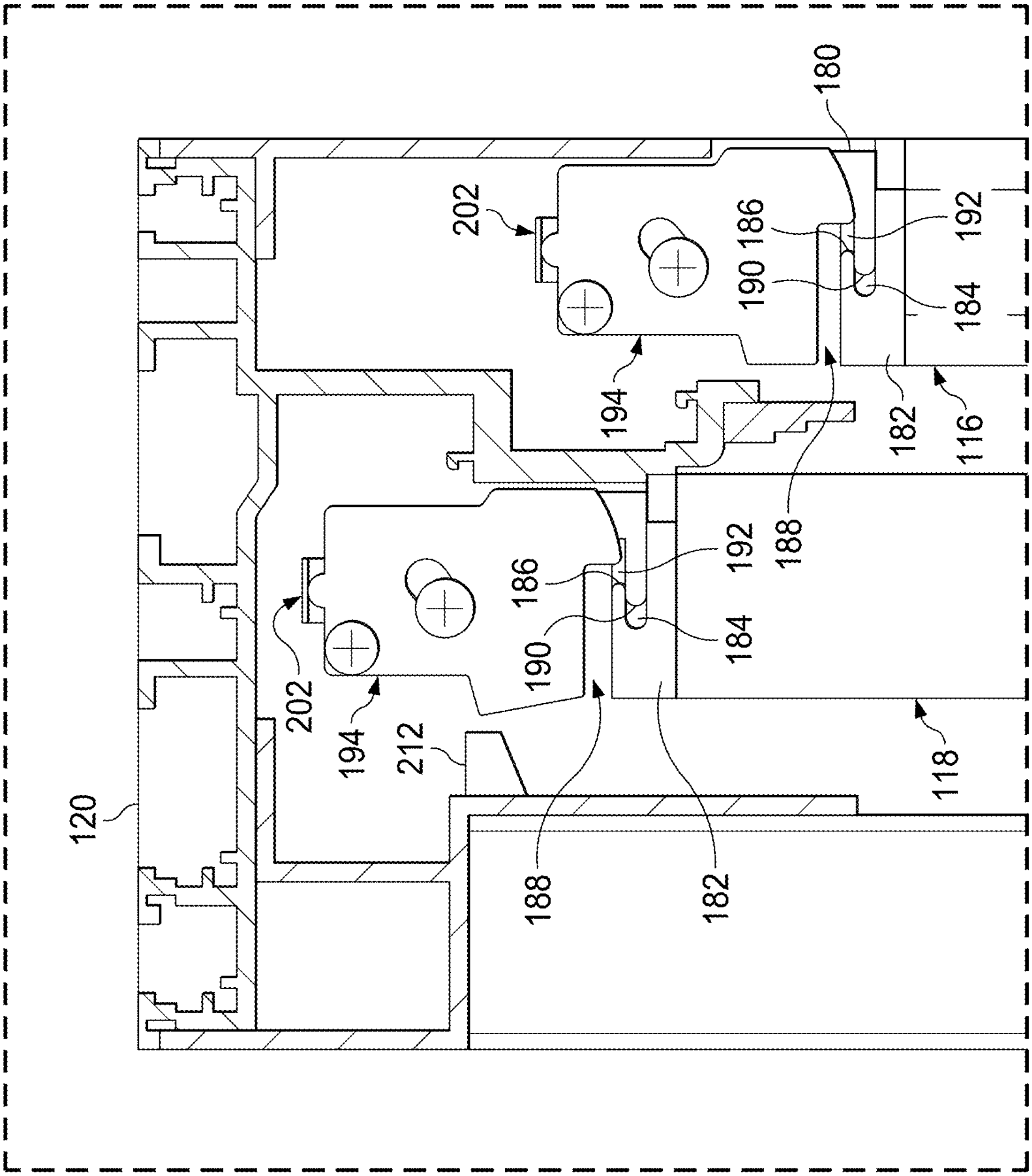
FIG. 17 is an enlarged view of a portion of FIG. 16, enlarging the portion encircled by box 17 in FIG. 16 according to an embodiment of the present disclosure.
Figure 16:
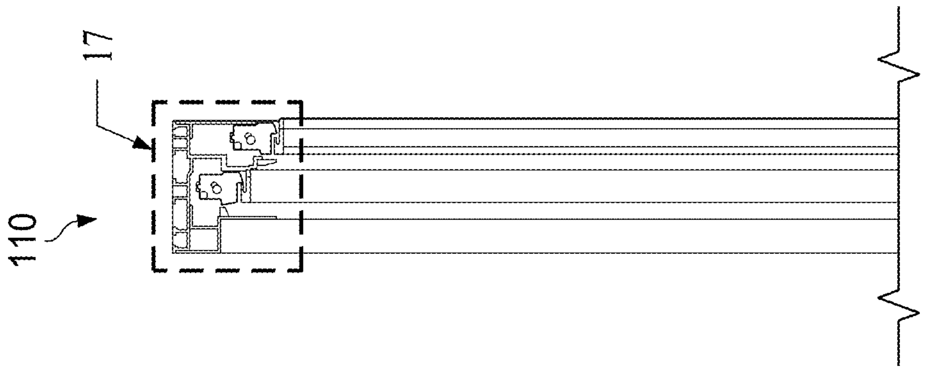
FIG. 16 is a cross-section view of the door system shown in FIG. 15 taken along line 14 according to an embodiment of the present disclosure.

FIGS. 6 and 7 are partial perspective views of a slow slide panel 116 or fast slide panel 118. The engaging rail 180 is part of the header 120 (see FIGS. 4 and 5 for example). FIG. 6 shows the panel 116 or 118 in a pivot open position with respect to the engaging rail 180 and FIG. 7 shows the panel 116 or 118 in a pivot closed position with respect to the engaging rail 180. FIGS. 6, 7, and 17 (FIG. 17 is an enlarged partial cross-sectional view of the door system 110 of FIG. 14 which itself is a cross-sectional view of the door system 110 of FIG. 15) show the panel 116 or 118 has engaging structure 182 that includes a channel 184 and an overhand or protrusion 186. Corresponding engaging structure 188 is found on the engaging rail 180. As shown in FIG. 15, the panels 116 and 118 are engaged with the engaging structure 188 of engaging rails 180 of the header 120.

Returning to FIGS. 6 and 7, a crawl arrester 194 is mounted onto the engaging rail 180. In some embodiments, the crawl arrester 194 is an asymmetrically pivoted, spring loaded 5.6 mm thick plate screwed on to the panel 116, 118 by shoulder bolts 196, 198 with a ¼ inch long shoulder. The crawl arrester 194 may be attached via fasteners such as, but not limited to bolts 196, 198. In some embodiments, bolt 196 is a pivot fastener and bolt 198 is a sliding fastener. In some implementations, bolt 198 may be located in a slot 200 thereby allowing the crawl arrester 194 to pivot about the pivot fastener or shoulder bolt 196. The crawl arrester 194 includes a crawl projection 206 on the top of the crawl arrester 194. A spring 202 secured to the engaging rail 180 with spring screws 204. The spring 202 urges against the crawl projection 206 to bias the crawl arrester 194 to a pivoted position as shown in FIG. 7.

Figure 8:
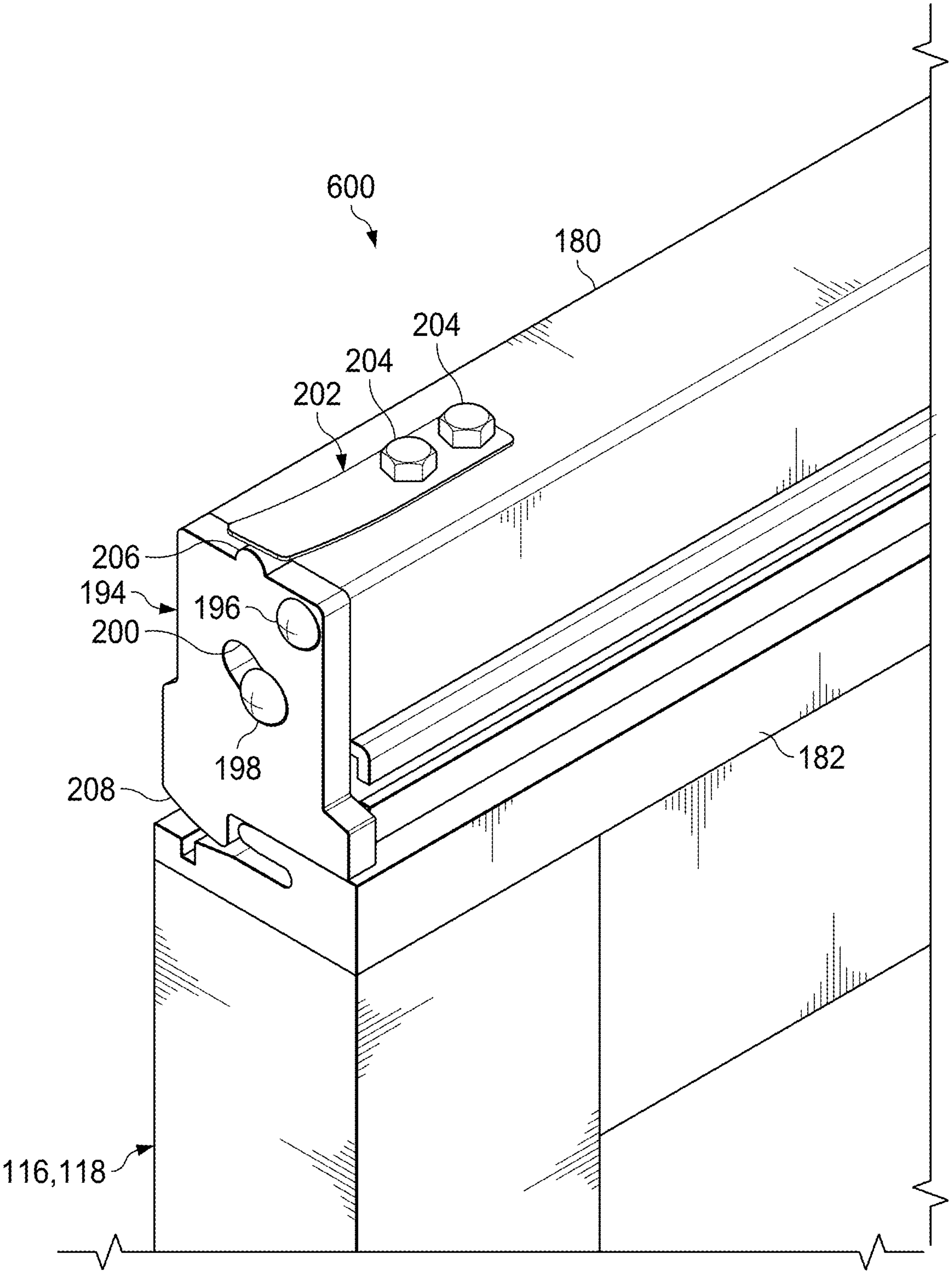
FIG. 8 is a partial detailed view of a door system where the doors are in a non-broken out position according to an embodiment of the present disclosure.

FIG. 6 shows the panel 116, 118 is a non-broken out position. It is understood that in some embodiments, and as shown, multiple sliding panels 116, 118 may be equipped with crawl arresters 194 and related crawl arresting systems, for example, one for each sliding door or panel. While FIGS. 6 and 7 show features of a crawl arresting system, they can be applied to multiple panels or doors. In the non-broken out position, the protrusion 186 contacts the rocking projection 208 on the crawl arrester 194 and counters the biasing force of the spring 202 urging against the crawl projection 206 causing the crawl arrester 194 to be in a non-arresting position as shown in FIG. 7 or 8.

During sliding operation of the panels 116, 118 or doors, the protrusion 186 keeps the crawl arrester 194 out of the way in a stowed position, but at slide open position, when the door panel(s) are broken out, the protrusion 186 no longer keeps the crawl arrester 194 in the stowed position. The crawl arrester 194 kicks out due to the resisting force of the spring 202. The breakout crawl arrester pivots about the asymmetric pivot point (bolt 198) and into a cut out 210 (see FIG. 6) in the header 120 which acts as a block or interacts with an obstacle such as a block 212 preventing the engaging rail 180 from moving or crawling toward the slide close position. Closing the door from the pivot break out position to a pivot closed position pushes the arrester back in place to allow or sliding.

When the panel 116 or 118 breaks out, the protrusion 186 is no longer in contact with the rocking protrusion 208 thereby allowing the spring 202 to urge against the crawl projection 206 to move and/or bias the crawl arrester 194 to the position shown in FIG. 7.

FIGS. 4 and 5 show the door system 110 including the header 120 and lead jamb 166. In FIG. 4 (and FIG. 6 that corresponds to magnified portion 6 of FIG. 4), the door panels 116, 118 are in a non-broken out position and are substantially parallel with respect to the side light panel 114. In FIG. 5 (and FIG. 7 that corresponds to magnified portion 7 of FIG. 5), the doors panels 116, 118 are in a broken-out position and are at an angle with respect to the side light panel 114.

Figure 9:
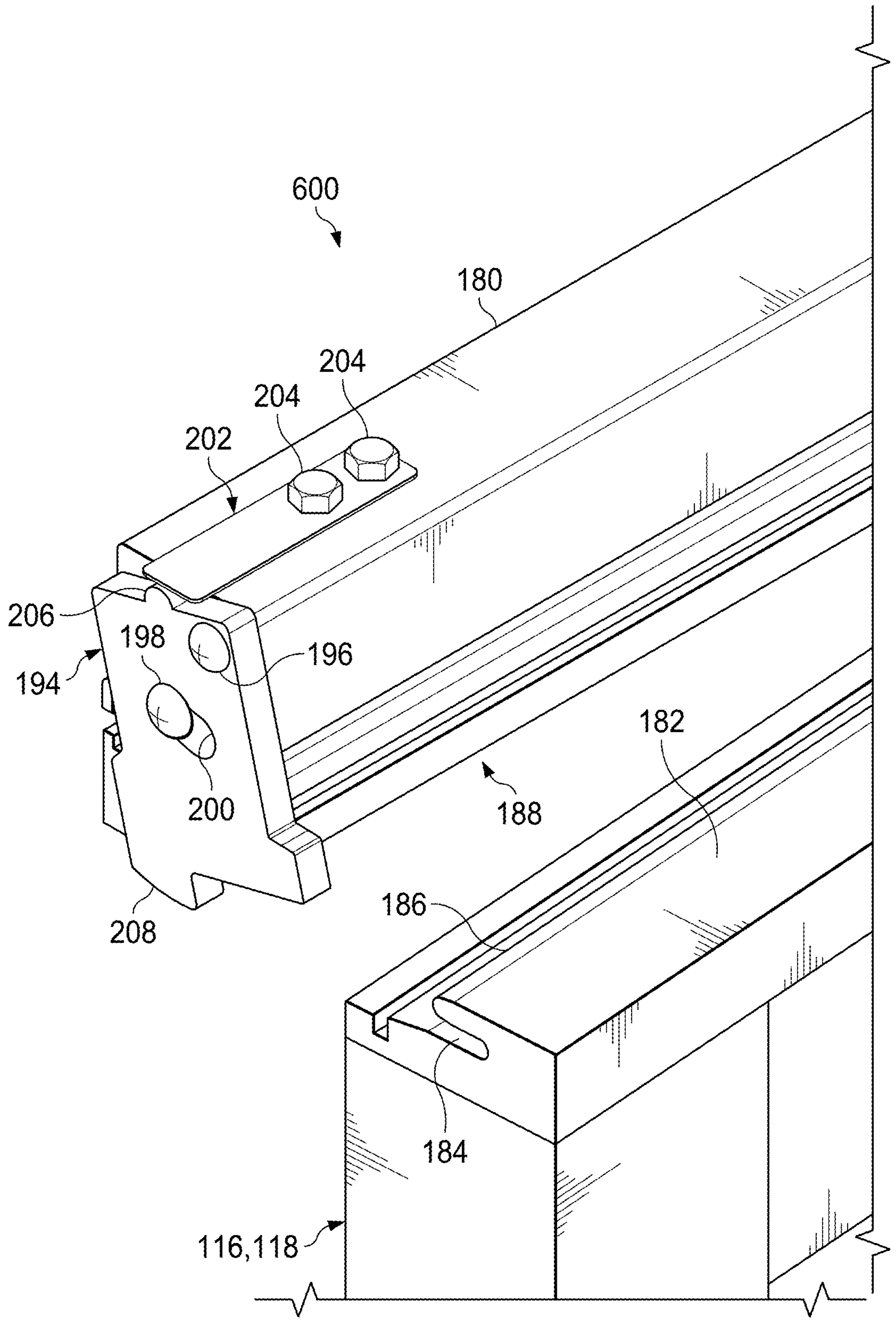
FIG. 9 is a partial detailed view of a door system where the doors are in a broken out position according to an embodiment of the present disclosure.

When in the breakout position as shown in FIGS. 5, 7, and 9, the crawl arrester 194 is pivoted about the pivot fastener or bolt 198 by the spring 202 to the skewed or deployed position shown in these figures. FIG. 14 is an enlarged partial cross-sectional view of the door system 110 of FIG. 13 which itself is a cross-sectional view of the door system 110 of FIG. 12. Because the crawl arrester 194 is in the skewed (deployed or blocking) position, the crawl arrester 194 will engage the block 212 mounted to the header 120 with the block screws 214. As shown in FIG. 8, there is a cut out 210 in the header 120 for the crawl arrester 194 to deploy. With the crawl arrester 194 in the deployed or blocking position, the sliding movement of the engaging rail 180 of the slow slide panel 116 and fast slide panel 118 toward the lead jamb 166 is blocked when crawl arrester 194 contacts the block 212. The block 212 limits the sliding or linear movement of the engaging rail 180 to a threshold amount. The magnitude of the threshold is determined by the location of the block 212. By the operation of the crawl arrester 194 stopped against the block 212, the engaging rails 180 are prevented from moving or "crawling" toward a sliding closed position as they would normally do due to a lack of support at the lower corners closest to the lead jamb 166 and the pull of gravity on the slow slide panel 116 and the fast slide panel 118. The pull of gravity on the slow slide panel 116 and the fast slide panel 118 may cause the engaging rail 180 to move or crawl forward toward the slide close position during breakout, interrupting the motion or the crawl of the engaging rail during breakout and preventing the slow slide panel 116 and the fast slide panel 118 from dropping down as far as they normally would.

When the door system 110 is not in a broken-out position as shown in FIGS. 4, 6, and 8, the crawl arrester 194 is in the non-deployed position, and thereby does not contact the block 212. As a result, the slow slide panel 116 and fast slide panel 118 are free to slide to and away from the lead door jamb 166 without impedance.

Figure 10A:
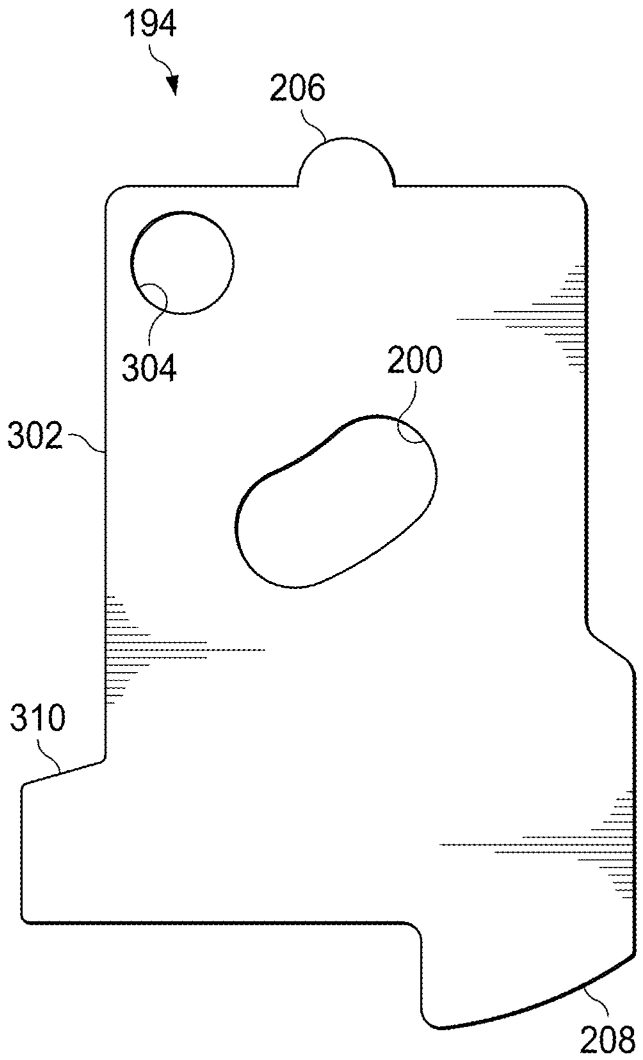
FIG. 10A is a front perspective view of a crawl arrester according to an embodiment of the present disclosure.
Figure 10B:
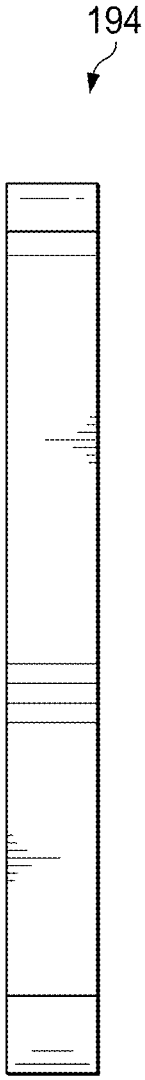
FIG. 10B is a side perspective view of a crawl arrester according to an embodiment of the present disclosure.

FIGS. 10A and 10B show perspective views of the crawl arrester 194. In some implementations, the crawl arrester 194 has a planar form with a body 302, crawl projection 206, rocking projection 208, front projection 310, and slots 200, 304. The crawl arrester 194 may configured to be secured to the engaging rail 180 with shoulder bolts 196, 198 that pass through slots 304, 200 as shown in FIGS. 8 and 9. In some implementations, the crawl arrester 194 has a thickness of about 0.24 inches, or between 0.1 and 0.5 inches. The crawl arrester 194 may be formed out of metal, such as steel.

Figure 11A:
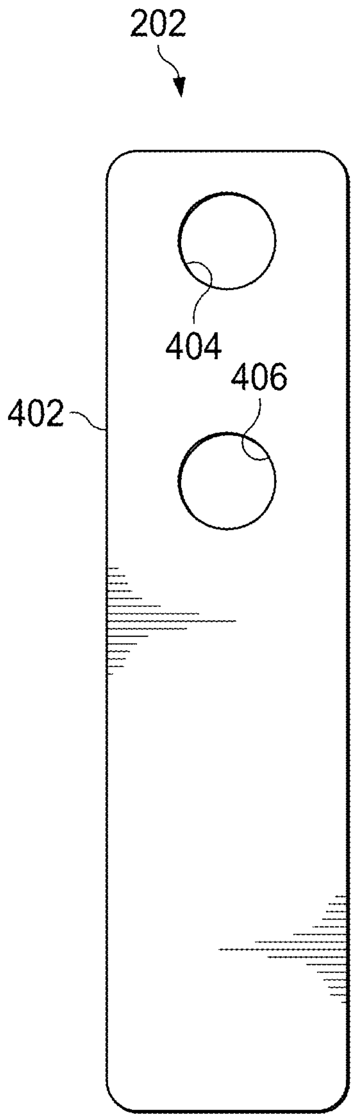
FIG. 11A is a front perspective view of a spring according to an embodiment of the present disclosure.
Figure 11B:
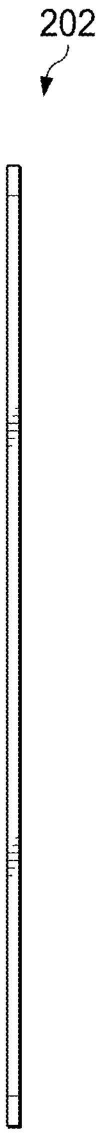
FIG. 11B is a side perspective view of a spring according to an embodiment of the present disclosure.
Figure 12:
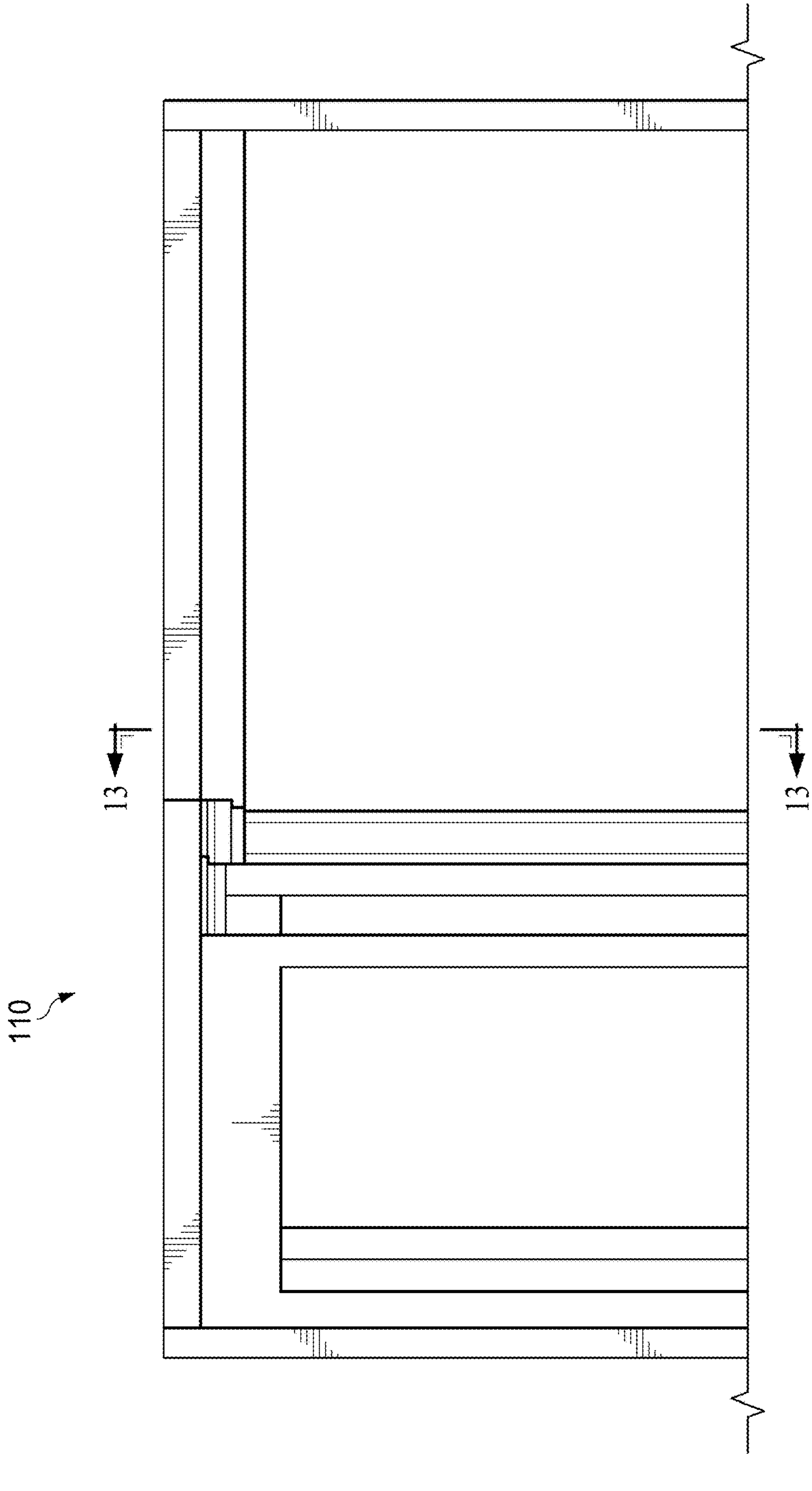
FIG. 12 is a front view of a door system according to an embodiment of the present disclosure.

FIGS. 11A and 11B show perspective views of the spring 202, which may include spring body 402 formed from a resilient, flexible material such as metal. Slots 404, 406 may be formed in the spring body 402. In some implementations, the spring 202 is secured to the engaging rail 180 with spring screws 204 that pass through the slots 404, 406. The spring 202 is configured to apply pressure to the crawl projection 206 of the crawl arrester to maintain it in a pivoted position as shown in FIG. 7.

Figure 18:
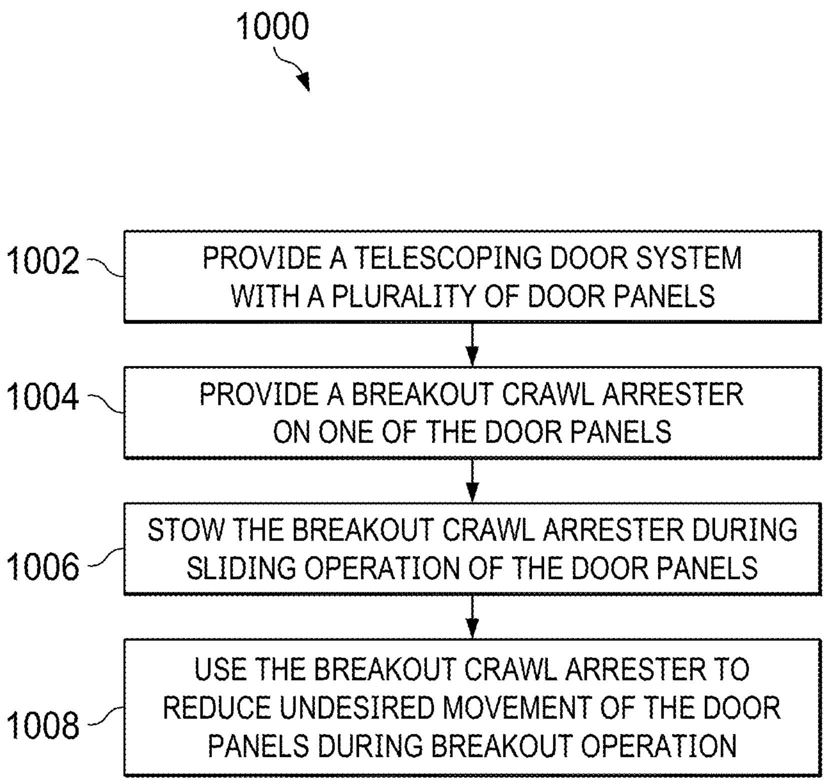
FIG. 18 is a flowchart illustrating a method for using a telescoping door system with a breakout crawl arrester according to embodiments of the present disclosure.

FIG. 18 shows a flowchart illustrating a method 1000 for using a telescoping door system with a breakout crawl arrester according to embodiments of the present disclosure. The telescoping door system and breakout crawl arrester may be the telescoping door system 110 and breakout crawl arrester 194 described in FIGS. 1-17.

The method 1000 may include block 1602 to provide a telescoping door system with a plurality of door panels such as telescoping door system 110 with panels 114, 116, 118 as discussed in reference to FIGS. 1-15. In some implementations, this telescoping door system may be configured to breakout such that the door panels may be pivoted from the normal sliding configuration to a breakout configuration. This may provide additional clearance in the doorway of the telescoping door system.

The method 1000 may also include block 1004 to provide a breakout crawl arrester on one of the door panels. For example, this breakout crawl arrester may be the breakout crawl arrester 194 as discussed in reference to FIGS. 1-15. In some implementations, the breakout crawl arrester comprises a spring loaded plate screwed onto the door panel.

The method 1000 may also include block 1006 to stow the breakout crawl arrester during normal sliding operation of the door panels. For example, the breakout crawl arrester may have a mechanism such as a protrusion to keep the breakout crawl arrester aligned with the door panels during sliding operations.

The method 1000 may also include block 1008 to use the breakout crawl arrester to reduce undesired movement of the door panels during a breakout operation. In this case, the breakout crawl arrester may be spring loaded or otherwise biased against the door panel such that when the door panels are broken out, the breakout crawl arrester pivots out and prevents the panels from moving relative to each other until they are pivoted back from the breakout configuration to the normal sliding operation. This may reduce undesired crawl of the door panels and mitigation damage to the door system as well as the floor.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

I claim:

1. A breakout door system comprising:

a door frame;

a first door with a first side having a first pivot and a second side opposite the first side, the first door configured to selectively slide and pivot between an open and closed slide position and an opened and closed pivot position with respect to the door frame;

a crawl arrester comprising a first portion and a second portion, the crawl arrester configured to move between a deployed position when the first door is not in the closed pivot position and a stowed position when the first door is in the closed pivot position, the first portion of the crawl arrester mounted to one of the first door and the door frame, wherein as the crawl arrester moves to the deployed position, the second portion of the crawl arrester moves away from the one of the first door and the door frame to which the first portion of the crawl arrester is mounted; and an arrester stop mounted to the other of the first door and the door frame than the crawl arrester, wherein when the crawl arrester is in the deployed position, the second portion of the crawl arrester contacts the arrester stop to prevent the second side of the first door from dropping in a downward direction.

2. The breakout door system of claim 1, further comprising:

a second door with a first side having a second pivot and a second side opposite the first side, the second door configured to selectively slide and pivot between an open and closed slide position and an opened and closed pivot position with respect to the door frame;

a second crawl arrester configured to move between a deployed position when the second door is not in the closed pivot position and a stowed position when the second door is in the closed pivot position, the crawl arrester mounted to one of the second door and the door frame; and a second arrester stop mounted to the other of the second door and the door frame than the second crawl arrester, wherein when the second crawl arrester is in the deployed position, the second crawl arrester contacts the second arrester stop to prevent the second side of the second door from dropping in a downward direction.

3. The breakout door system of claim 1, wherein the crawl arrester moves by pivoting.

4. The breakout door system of claim 1, further comprising a spring biasing the crawl arrester to the deployed position.

5. The breakout door system of claim 4, wherein the spring is a leaf spring.

6. The breakout door system of claim 4, further comprising a spring projection located on the crawl arrester and configured to allow the spring to bias the crawl arrester to the deployed position.

7. The breakout door system of claim 4, wherein biasing the crawl arrester to the deployed position includes biasing the crawl arrester in a direction laterally away from the first door or the door frame to which the first portion of the crawl arrester is mounted.

8. The breakout door system of claim 4, wherein the spring is disposed vertically above the crawl arrester.

9. The breakout door system of claim 1, further comprising a rocking projection located on the crawl arrester and configured to move the crawl arrester to the stowed position when the first door is in the closed pivot position.

10. The breakout door system of claim 1, further comprising a door projection mounted on the first door and configured to engage the crawl arrester and move the crawl arrester to the stowed position when the first door is moved to the closed pivot position.

11. The breakout door system of claim 1, wherein the crawl arrester is dimensioned and configured to allow the first door to slide with respect to the door frame when the crawl arrester is in the stowed position.

12. The breakout door system of claim 1, wherein the arrester stop extends laterally away from the first door or the door frame to which the arrester stop is mounted.

13. A method of stopping a door with a first side having a first pivot and a second side opposite the first side, the door configured to selectively slide and pivot between an open and closed slide position and an opened and closed pivot position with respect to a door frame, the method comprising:

moving a crawl arrester comprising a first portion and a second portion to a deployed position when the door is not in the closed pivot position, the first portion of the crawl arrester mounted to one of the door and the door frame, wherein as the crawl arrester moves to the deployed position, the second portion of the crawl arrester moves away from the one of the door and the door frame to which the first portion of the crawl arrester is mounted;

contacting the second portion of the crawl arrester against an arrester stop mounted to the other of the door and the door frame when the crawl arrester is in the deployed position to prevent the second side of the door from dropping in a downward position and to limit the door from moving past a threshold amount toward the open slide position;

biasing, with a spring, the crawl arrester to the deployed position;

allowing, with a spring projection located on the crawl arrester, the spring to bias the crawl arrester to the deployed position; and moving, with a rocking projection located on the crawl arrester, the crawl arrester to a stowed position when the door is in the closed pivot position.

14. The method of claim 13, further comprising urging the spring against the spring projection on the crawl arrester.

15. The method of claim 13, further comprising allowing the door to slide past the arrester stop when the crawl arrester is in the stowed position.

16. The method of claim 15, wherein moving the crawl arrester is done by pivoting the crawl arrester.

17. The method of claim 16, wherein the pivoting is done by engaging the rocking projection on the crawl arrester with a protrusion on the door as the door approaches and achieves the closed pivot position.

18. A breakout door system comprising:

a door frame;

a first door configured to selectively slide and pivot between an open and closed slide position and an opened and closed pivot position with respect to the door frame;

a crawl arrester comprising a first portion and a second portion, the crawl arrester configured to move between a deployed position when the first door is not in the closed pivot position and a stowed position when the first door is in the closed pivot position, the first portion of the crawl arrester mounted to one of the first door and the door frame, wherein as the crawl arrester moves to the deployed position, the second portion of the crawl arrester moves away from the one of the first door and the door frame to which the first portion of the crawl arrester is mounted;

an arrester stop mounted to the other of the first door and the door frame than the crawl arrester, wherein when the crawl arrester is in the deployed position, the second portion of the crawl arrester contacts the arrester stop to limit the first door from moving past a threshold amount toward the open slide position;

a spring biasing the crawl arrester to the deployed position;

a spring projection located on the crawl arrester and configured to allow the spring to bias the crawl arrester to the deployed position; and a rocking projection located on the crawl arrester and configured to move the crawl arrester to the stowed position when the first door is in the closed pivot position.

19. The breakout door system of claim 18, further including a door projection mounted on the first door and configured to engage the crawl arrester and move the crawl arrester to the stowed position when the first door is moved to the closed pivot position.

20. The breakout door system of claim 18, further comprising:

a second door configured to selectively slide and pivot between an open and closed slide position and an opened and closed pivot position with respect to the door frame;

a second crawl arrester configured to move between a deployed position when the second door is not in the closed pivot position and a stowed position when the second door is in the closed pivot position, the crawl arrester mounted to one of the second door and the door frame; and a second arrester stop mounted to the other of the second door and the door frame than the second crawl arrester, wherein when the second crawl arrester is in the deployed position, the second crawl arrester contacts the second arrester stop to limit the second door from moving past a threshold amount toward the open slide position.

* * * * *